UNITED STATES PATENT OFFICE.

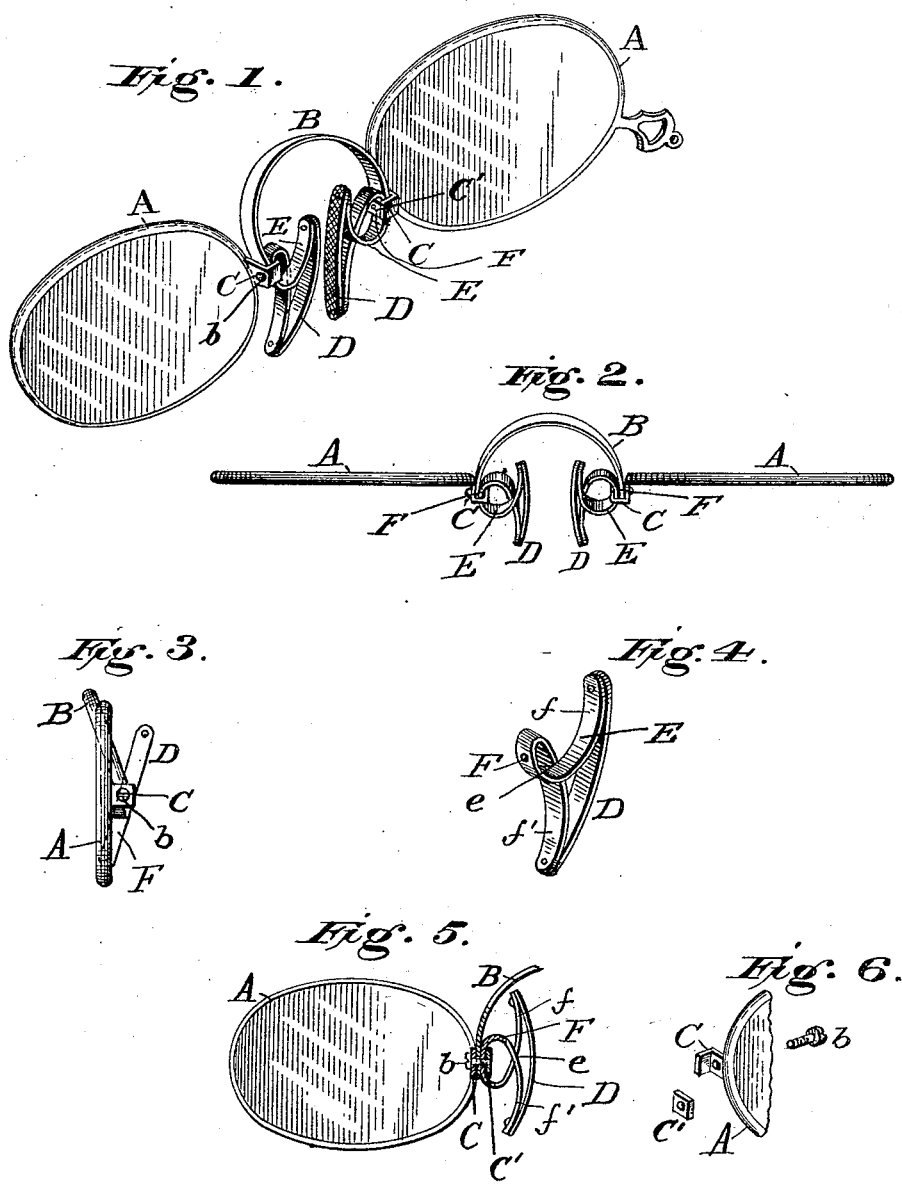

ERNEST L. McDOWELL, OF ARKANSAS CITY, KANSAS.

EYEGLASS-FRAME.

SPECIFICATION forming part of Letters Patent No. 511,638, dated December 26, 1893.

Application filed February 6, 1893. Serial No. 461,187. (No model.)

*To all whom it may concern:*

Be it known that I, ERNEST L. McDOWELL, a citizen of the United States, and a resident of Arkansas City, in the county of Cowley and State of Kansas, have invented certain new and useful Improvements in Eyeglass-Frames; and I do hereby declare that the following is a full, clear, and exact description of the invention, such as will enable others skilled in the art to which it appertains to make and use the same, reference being had to the accompanying drawings, which form a part of this specification, and in which—

Figure 1 is a perspective view of a pair of eye glasses fitted with my improved frame. Fig. 2 is a top view of the same. Fig. 3 is an end view. Fig. 4 is a perspective detail-view of one of the nose-clamps with its springs. Fig. 5 is a sectional detail view of the fastening for the nose-clamps and bridge-spring to the side frames; and Fig. 6 is a perspective detail view of the parts which comprise said fastening, separated from one another.

Like letters of reference denote corresponding parts in all the figures.

This invention relates to that type of eyeglass frames which are provided with self-adjustable nose-clamps or holders; and my improvement consists in the novel construction of the automatic nose-clamps as hereinafter described, whereby the frame will adjust itself to any form of nose and in such a manner as to hold the glasses at the proper angle to the eyes, as will be hereinafter more fully described and claimed.

Referring to the drawings, the letter A designates the glass frames, which are united by the usual nose-spring or bridge-piece B, the ends of which are connected to the inner ends of the frames A A by being clasped between the clamps C and nuts C', as shown more clearly in the detail view Fig. 5. The nose-clamps, D, are of the usual convex-shape, and corrugated on the outside (or they may be covered on the outside with cork, rubber, celluloid, or other suitable material.) Each of these clamps D is fastened, at opposite ends, to a spring, E, which is bent so as to form a loop, F, forming its means of attachment to the nutted bridge-clamps C. By the bending of the spring to form this loop, it will be seen that the ends of the spring, designated by the reference letters $f$ and $f'$, form spring-arms which cross each other at the point $e$, between the loop and the ends of the nose-clamp. This is an important feature of my improvement, because by this construction and arrangements of these springs relative to the frames and nose-clamps, the latter will be tilted at the proper angle, as will be seen more clearly by reference to Fig. 3, and, at the same time, a compound spring is formed by the central spring-loop F and its arms $f f'$, which permits of the easy and automatic adjustment of the frame upon the nose of the wearer, without undue pressure, and yet with sufficient firmness to hold the frame firmly in its place and at the proper angle to properly focus the glasses. The spring-loop F is fastened to the frames by the same clamps, C, and their appropriate nuts C', which clamp the ends of the middle-spring or bridge-piece B; a small screw, $b$, being inserted through the clamp, C, and its nut C', and through the ends of the bridge-piece and the middle of the appropriate spring-loop F, so as to hold or bind the several parts firmly together.

Having thus described my invention, I claim and desire to secure by Letters Patent of the United States—

The combination of the frames A A, bridge-spring B, and nose-clamps, D, having the springs E bent so as to form spring-loops F and arms $f, f'$, crossing each other between the loop and their point of attachment to the ends of the clamp; substantially as and for the purpose shown and set forth.

In testimony that I claim the foregoing as my own I have hereunto affixed my signature in presence of two witnesses.

ERNEST L. McDOWELL.

Witnesses:
HOWARD AKIN,
FRANK McDOWELL.